(12) United States Patent
Gericke et al.

(10) Patent No.: US 6,416,119 B1
(45) Date of Patent: Jul. 9, 2002

(54) VEHICLE FRONT END CONSTRUCTION THROUGH THE USE OF HYDROFORMED TUBES

(75) Inventors: Dean Gericke, Brighton; Ian N. Dupret, Farmington Hills; Glenn D. Holland, West Bloomfield, all of MI (US)

(73) Assignee: DaimlerChrysler, Auburn Hills, MI (US)

( * ) Notice: Subject to any disclaimer, the term of this patent is extended or adjusted under 35 U.S.C. 154(b) by 0 days.

(21) Appl. No.: 09/426,512

(22) Filed: Oct. 26, 1999

(51) Int. Cl.$^7$ ................................................ B62D 25/08
(52) U.S. Cl. .................. 296/205; 296/203.06; 29/897.2
(58) Field of Search .................................... 296/193, 194, 296/203.01, 264, 205, 203.02, 92; 29/897.2; 180/68.4

(56) References Cited

U.S. PATENT DOCUMENTS

| | | |
|---|---|---|
| 5,269,585 A | 12/1993 | Klages et al. |
| 5,332,281 A | 7/1994 | Janotik et al. |
| 5,382,071 A | 1/1995 | Enning et al. |
| 5,458,393 A | 10/1995 | Benedyk |
| 5,549,352 A | 8/1996 | Janotik et al. |
| 5,561,902 A | 10/1996 | Jacobs et al. |
| 5,593,245 A * | 1/1997 | Herz et al. ............... 296/205 X |
| 5,720,092 A | 2/1998 | Ni et al. |
| 5,720,511 A | 2/1998 | Benedyk |
| 5,800,003 A | 9/1998 | Clenet |
| 5,819,408 A | 10/1998 | Catlin |
| 5,839,776 A | 11/1998 | Clausen et al. |
| 5,839,777 A | 11/1998 | Vlahovic |
| 5,882,039 A | 3/1999 | Beckman et al. |
| 5,884,722 A | 3/1999 | Durand et al. |
| 5,899,498 A | 5/1999 | Horton |
| 6,170,906 B1 * | 1/2001 | Kasuga .................. 296/203.02 |
| 6,193,274 B1 * | 2/2001 | Brown et al. ........ 296/203.02 X |
| 6,227,321 B1 * | 5/2001 | Fracaroli et al. ........... 180/68.4 |

FOREIGN PATENT DOCUMENTS

| | | | | |
|---|---|---|---|---|
| GB | 2153751 A | * | 2/1984 | ................. 296/194 |
| JP | 62-83253 A | * | 10/1985 | ................. 296/194 |
| SU | 996-253 A | * | 2/1985 | ................. 296/194 |

* cited by examiner

Primary Examiner—Stephen T. Gordon
Assistant Examiner—Jason Morrow
(74) Attorney, Agent, or Firm—Ralph E. Smith

(57) ABSTRACT

The vehicle body of the present invention includes a first body structure formed from a plurality of tube members and a second body structure formed from sheet metal. The plurality of tube members are loosely fastened together so as to form the first body structure. The first body structure is splayed in a predetermined direction, inserted between two sheet metal members of the second body structure and fixedly secured thereto. Since the tube members are not rigidly fastened together, the tube members are free to move relative to one another in a direction lateral to the longitudinal axis of the vehicle, thereby permitting for size variation in the second body structure. The tube members are then securely fastened together. The design of the first and second body structures facilitates a welding process wherein the welds joining the first and second body structures may be staggered and offset to further improve the rigidity and durability of the vehicle body.

15 Claims, 6 Drawing Sheets

VEHICLE FRONT END CONSTRUCTION THROUGH THE USE OF HYDROFORMED TUBES

BACKGROUND OF THE INVENTION

1. Technical Field

The present invention pertains generally to motor vehicles. More particularly, the present invention pertains to vehicle bodies. More specifically, but without restriction to the particular embodiment and/or use which is shown and described for purposes of illustration, the present invention relates to a vehicle body having a portion constructed from a hydroformed tubular material.

2. Discussion

In the field of motor vehicles, especially pick-up trucks and similar vehicles, it is highly desirable to provide a tubular body to increase the strength and durability of a vehicle. Despite their advantages, tubular bodies have generally not enjoyed widespread commercial use in vehicle designers for various reasons, including the ability to consistently manufacture tubular members of the body, the ability to consistently assemble the body and the ability to integrate conventional sheet metal fabrications (e.g., doors, fenders) to a tubular body.

With the advent of modern hydroforming techniques, many of the concerns regarding the consistency with which the various body members may be manufactured have been rendered moot. However, significant issues with both the ability with which the vehicle body may be assembled and the use of conventional sheet metal fabrications with such tubular body frames.

SUMMARY OF THE INVENTION

It is one object of the present invention to provide an improved vehicle body construction which provides the advantages of a tubular construction and the ability to easily integrate conventional sheet metal fabrications into the vehicle.

It is another object of the present invention to provide an improved vehicle body construction which provides the advantages of a tubular construction and the ability to easily integrate automotive systems such as battery trays, air cleaners and radiators into the vehicle.

It is a further object of the present invention to provide an assembly method for installing a first body portion constructed from tubular members to a second body portion constructed from sheet metal.

The vehicle body of the present invention includes a first body structure formed from sheet metal and a second body structure formed from a plurality of tube members. The plurality of tube members are loosely fastened together so as to form the second body structure. The second body structure is splayed in a predetermined direction, inserted between two sheet metal members of the second body structure and fixedly secured thereto. Since the tube members are not rigidly fastened together, the tube members are free to move relative to one another in a direction lateral to the longitudinal axis of the vehicle, thereby permitting for size variation in the first body structure. The tube members are then securely fastened together. The design of the first and second body structures facilitates a welding process wherein the welds joining the first and second body structures may be staggered and offset to further improve the rigidity and durability of the vehicle body.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
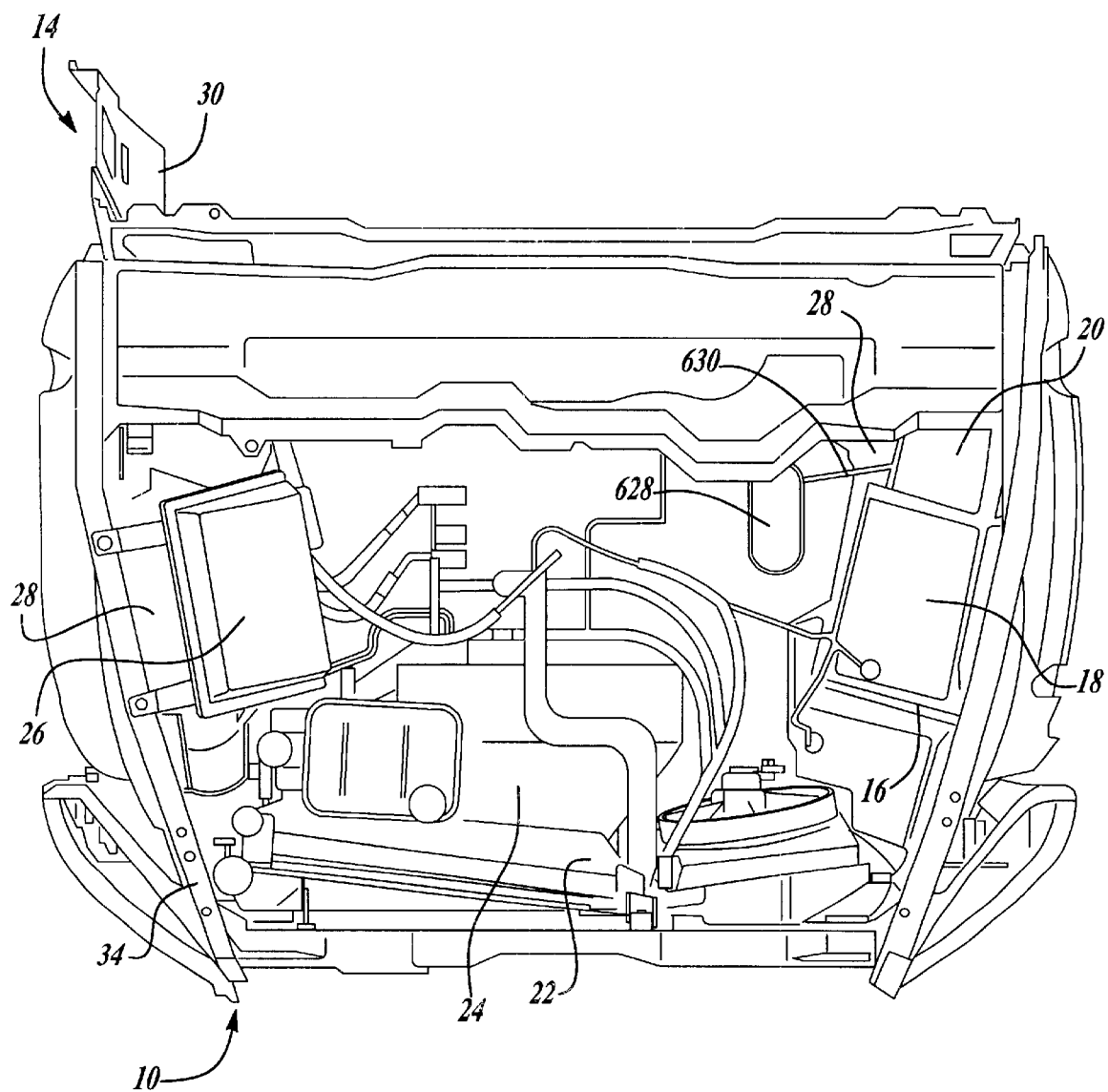
FIG. 1 is a top view of a portion of a vehicle constructed in accordance with the teachings of the present invention.
Figure 2:
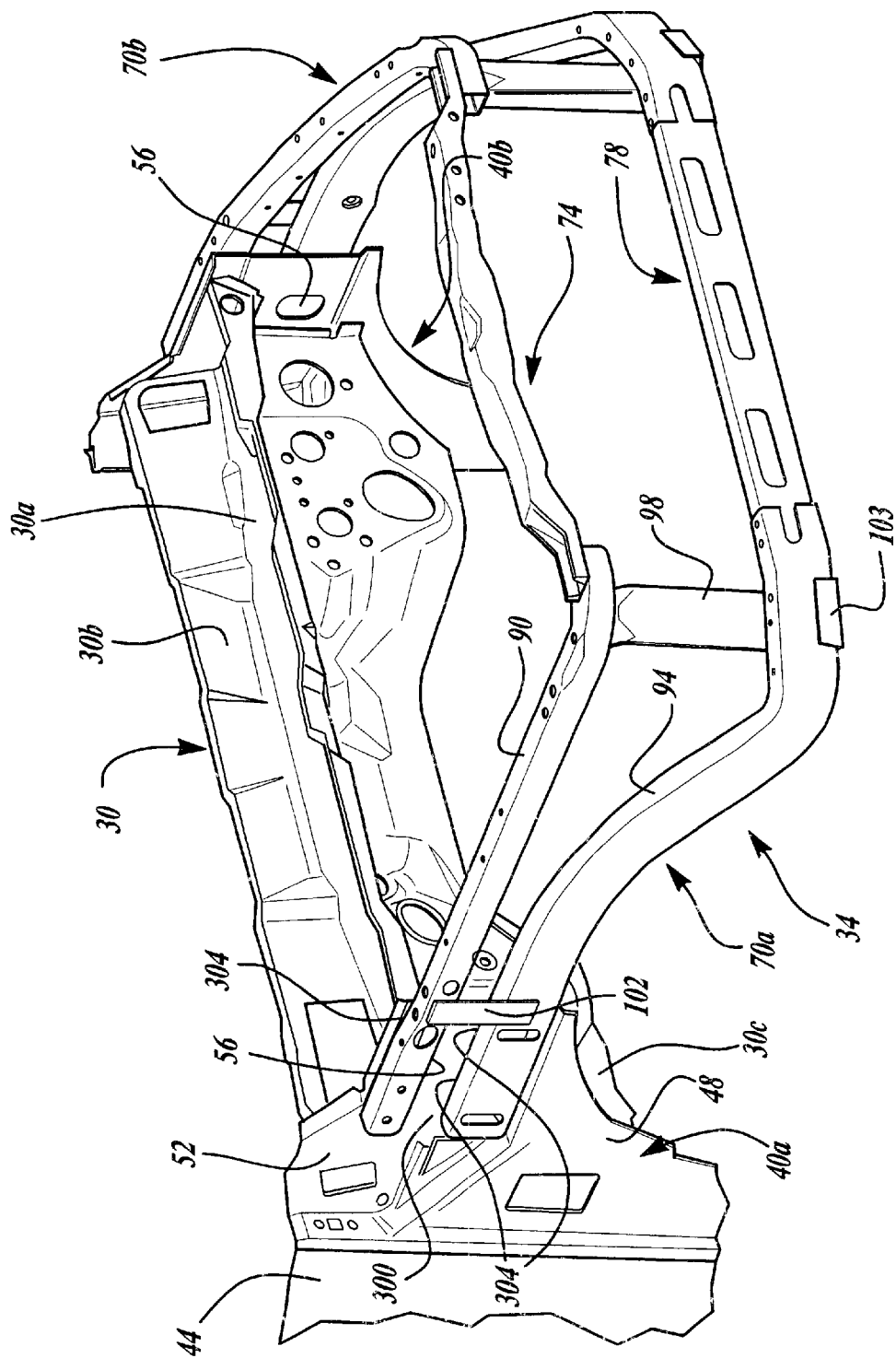
FIG. 2 is a perspective view of a portion of the vehicle of FIG. 1.

With reference to FIGS. 1 and 2 of the drawings, a motor vehicle constructed in accordance with the teachings of the preferred embodiment of the present invention is generally identified at reference numeral 10. As will be discussed in greater detail below, vehicle 10 includes a vehicle body 14, a battery tray mount 16, a battery 18, an anti-lock brake module 20, a radiator 22, a radiator shroud 24, an air cleaner 26 and wheel house linear wheel house liner 28.

Vehicle body 14 includes a first body structure 30 and a second body structure 34. First body structure 30 is formed from a sheet metal material and permits conventional sheet metal fabrications, such as dash 30a, plenum 30b and floor 30c, to be readily integrated into vehicle body 14. The construction of first body structure 30 is very similar to conventional sheet metal bodies except in the area proximate the connection to second body structure 34. Accordingly, only the unique portion of first body structure 30 will be discussed in detail.

Figure 5:
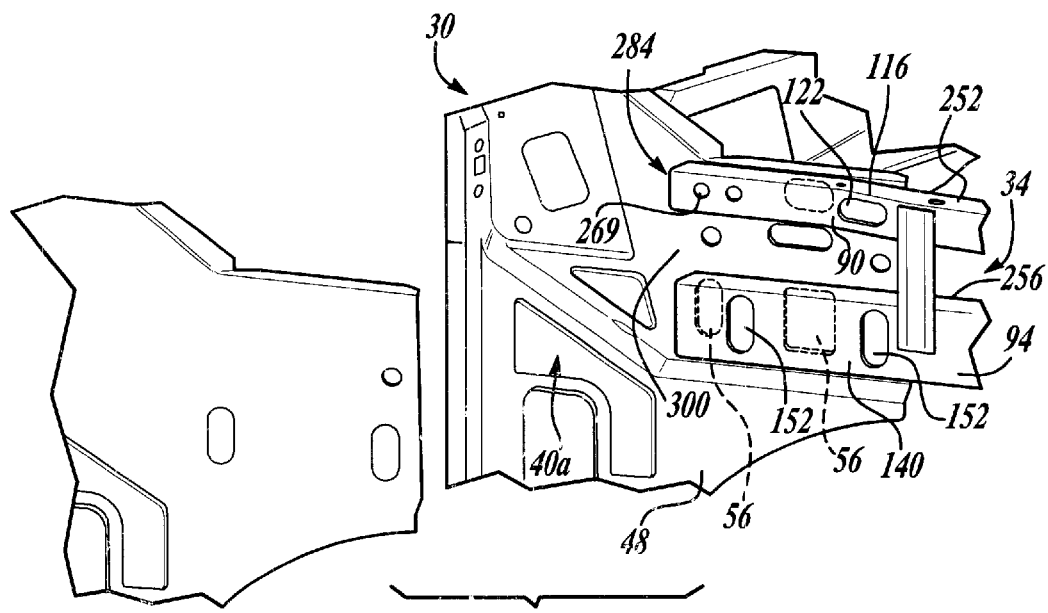
FIG. 5 is an exploded perspective view of a portion of the vehicle of FIG. 1.

With specific reference to FIG. 2, first body structure 30 is shown to include a pair of laterally spaced apart side panels 40a and 40b. As side panels 40a and 40b are identical in construction, only side panels 40a will be discussed in detail. Side panel 40a includes an upper surface 44 adapted to receive conventional body panels (not shown), a first recessed portion 48 recessed a first distance below upper surface 44 and a second recessed portion 52 recessed a second distance below upper surface 44 which is greater than the first distance. With brief reference to FIG. 5, second recessed portion 52 is shown to extend in a longitudinal direction in a manner approximately parallel the longitudinal axis of vehicle 10. Second recessed portion 52 is shown to include a plurality of first fastening apertures 56.

Figure 3:
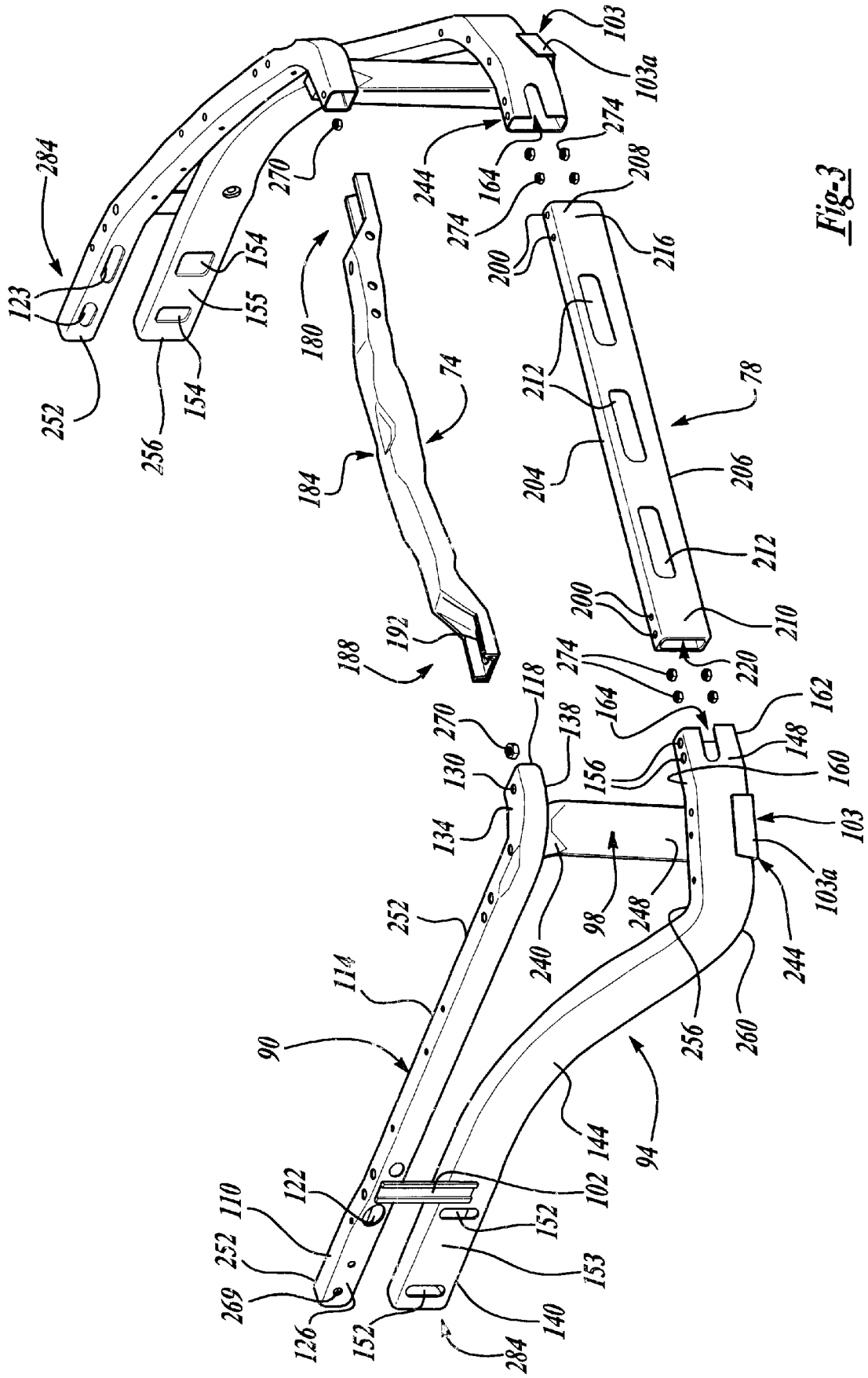
FIG. 3 is an exploded perspective view of the portion of the vehicle of FIG. 1.
Figure 4:
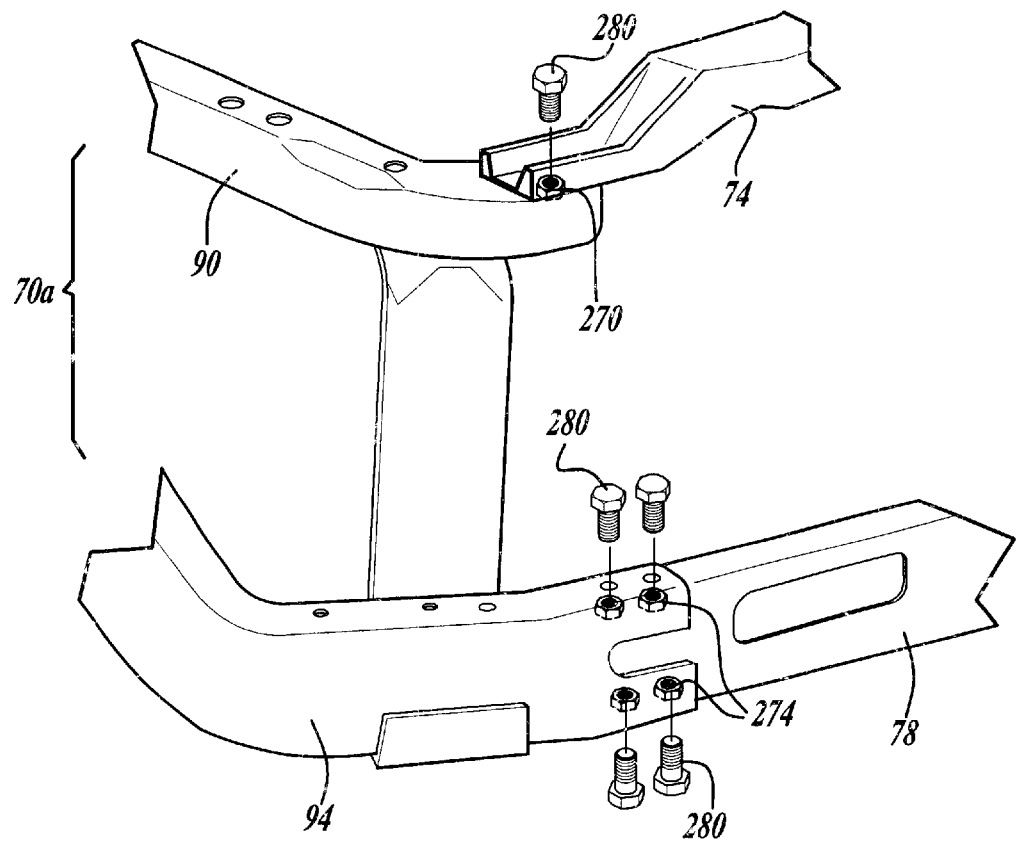
FIG. 4 is an exploded perspective view of a portion of the vehicle of FIG. 1.

Returning to FIG. 2, and with additional reference to FIGS. 3 and 4, second body structure 34 is shown to include a pair of lateral body structures 70a, 70b, an upper radiator tube structure 74 and a lower radiator tube structure 78. Lateral body structures 70a, 70b each include an upper fender rail structure 90, a lower fender rail structure 94, a front post structure 98, a rear post structure 102 and a frame mount bracket 103. Upper and lower fender rail structures 90 and 94, front post structure 98 and upper and lower radiator tube structures 74 and 78 are formed from a mild steel tubing having, in the example illustrated, a nominal wall thickness of approximately 1.3 mm. Rear post structure 102 and frame mount bracket 103 are stamped sheet metal fabrications.

In the particular example illustrated, upper fender rail structure 90 includes a rearward end section 110, an intermediate section 114 and a forward end section 118, each of which lie in a generally horizontal plane. Rearward end section 110 is generally parallel the longitudinal axis of vehicle 10 and has a generally square cross section. A first upper securing aperture 122 is formed in the outer surface 126 of rearward end section 110 and a pair of second upper securing aperture 123 is formed in the inner surface 252 or rearward end section 110. First and second upper securing apertures 122 and 123 will be discussed in greater detail, below. Intermediate section 114 is coupled to rearward end section 110 at a first end and to forward end section 118 at a distal end. Intermediate section 114 tapers inwardly from rearward end section 110 to forward end section 118. Forward end section 118 is generally perpendicular to the longitudinal axis of vehicle 10 and includes a fastening aperture 130 which extends through its upper surface 134. Fastening aperture 130 will be discussed in greater detail, below.

Upper fender rail structure 90 is formed from a tube having an initial length of about 50.5 inches and a diameter of about 2.5 inches. Upper fender rail structure 90 is initially processed through a pre-bending operation wherein intermediate and forward end sections 114 and 118 are positioned relative rearward end section 110. Upper fender rail structure 90 is next processed through a hydroforming operation wherein its cross-section is changed in a predetermined manner and any holes, including first and second upper securing apertures 122 and 123 and fastening aperture 130 are pierced. Preferably, the pressure exerted on the tubing during the hydroforming operation is sufficient to alter the cross-section of the tube but not sufficient to substantially reduce the wall thickness of the tube. Upper fender rail structure 90 is then trimmed to size.

Lower fender rail structure 94 is shown to include a rearward end section 140, an intermediate section 144, and a forward end section 148. Rearward end section 140 is generally rectangular in cross-section and includes a plurality of first lower securing apertures 152 formed in the outer surface 153 of lower fender rail structure 94 and a plurality of second lower securing apertures 154 formed in the inner surface 155 of lower fender rail structure 94. First and second lower securing apertures 152 and 154 will be discussed in greater detail, below. Intermediate section 144 is shown to couple rearward end section 140 to forward end section 148. Intermediate section 144 is shown to curve downwardly and then upwardly while tapering inwardly toward the longitudinal axis of vehicle 10 as lower fender rail structure 94 is traversed from rearward end section 140 to forward end section 148. Forward end section 148 is generally perpendicular to the longitudinal axis of vehicle 10 and includes a pair of slotted fastening apertures 156 in each of its upper and lower surfaces 160 and 162 respectively. Forward end section also includes a generally open end which forms a tube insertion member 164. The major axis of each of the slotted fastening apertures 156 is generally perpendicular to the longitudinal axis of vehicle 10. Fastening apertures 156 will be discussed in greater detail, below.

Lower fender rail structure 94 is formed from a tube having an initial length of about 70 inches and a diameter of about 3.6 inches. Lower fender rail structure 94 is initially processed through a pre-bending operation and then through a pre-forming operation where intermediate section 144 and forward end section 148 are positioned relative rearward end section 140. As compared to the process for forming upper fender rail structure 90, an additional pre-forming operation has been found to be desirable due to the non-planar configuration of lower fender rail structure 94. Lower fender rail structure 94 is next processed through a hydroforming operation wherein its cross-section is changed in a predetermined manner and any holes, including first and second lower securing apertures 152 and 154 and fastening apertures 156 are pierced. Preferably, the pressure exerted on the tubing during the hydroforming operation is sufficient to alter the cross-section of the tube but not sufficient to substantially reduce the wall thickness of the tube. Lower fender rail structure 94 is then trimmed to size.

Upper radiator tube structure 74 is shown to include a left end section 180, an intermediate section 184 and a right end section 188. Left and right end sections 180 and 188 each have a channel-shaped cross section with a slotted retention aperture 192, the major axis of which extends along the longitudinal axis of upper radiator tube structure 74. Upper radiator tube structure 74 is formed from a tube having an initial length of about 52.4 inches and a diameter of about 2.5 inches. Upper radiator tube structure 74 is initially processed through a pre-bending operation where left and right end sections 180 and 188 are pre-formed. Upper radiator tube structure 74 is next processed through a hydroforming operation wherein its cross-section is changed in a predetermined manner and any holes are pierced, including slotted retention apertures 192. Preferably, the pressure exerted on the tubing during the hydroforming operation is sufficient to alter the cross-section of the tube but not sufficient to substantially reduce the wall thickness of the tube. Upper radiator tube structure 74 is then trimmed to size.

Lower radiator tube structure 78 is generally rectangular in cross-section and includes a plurality of fastener apertures 200 in the upper and lower surfaces 204 and 206 of each of its left and right end sections 208 and 210, respectively. Lower radiator tube structure 78 also includes a plurality of slotted wind apertures 212 extending through its forward and rearward surfaces 216 and 220, respectively. Rearward post structure 102 is generally channel shaped in cross-section. Forward post structure 98 includes an upper end section 240, a lower end section 244 and a body portion 248. Body portion 248 is generally rectangular in cross-section. Upper end section 240 is contoured to fit along the inner surface 252 of upper fender rail structure 90 proximate the intersection between intermediate section 114 and forward end section 118. Lower end section 244 is generally rectangular in cross-section. Frame mount bracket 103 is generally U-shaped having a pair of legs 103a which a spaced apart sufficiently to permit front post structure 98 and lower fender rail structure to fit therebetween.

Lower radiator tube structure 78 and forward post structure 98 are formed from a tube having an initial length of about 84.4 inches and a diameter of about 3.25 inches. The tubing is processed through a hydroforming operation wherein its cross-section is changed in a predetermined manner and any holes are pierced, including the plurality of fastener apertures 200. Preferably, the pressure exerted on the tubing during the hydroforming operation is sufficient to alter the cross-section of the tube but not sufficient to substantially reduce the wall thickness of the tube. The tubing is then severed in predetermined locations to form and trim to size the lower radiator tube structure 78 and forward and rearward post structures 98 and 102.

Lateral body structures 70a, 70b are formed by inserting upper and lower fender rail structures 90 and 94 and front and rear post structures 98 and 102 into a fixture and welding the structures together, preferably through a M.I.G. welding process so as to maximize the strength of the structure while maintaining the heat-related distortion of the structure within desired limits. Clinch or RIV nuts, such as clinch nuts 269 and brackets (not shown) are fastened to lateral body structures 70a, 70b as desired to facilitate the mounting of various vehicle accessories (not shown).

Clinch nuts 270 are fixedly coupled to the fastening aperture 130 Clinch nuts 274 are also fixedly coupled in each of the plurality of fastener apertures 200 in lower radiator tube structure 78.

The components comprising second body structure 34 are next subassembled as shown in FIG. 4. Lateral body structures 70a, 70b are placed into an assembly fixture (not shown). The right and left ends 208 and 210 of lower radiator tube structure 78 are inserted into the insertion members 164 in the forward end sections 148 of lateral body structures 70b and 70a, respectively. Upper radiator tube structure 74 is positioned on the top surface 134 of the forward sections 118 of the upper fender rail structures 90. Fasteners 280 are placed into each of the lower fender rail structure 94 and the upper radiator tube structure 74 and rotated to engage the clinch nuts 270 and 274 in the upper fender rail structures 90 and lower radiator tube structure 78.

Preferably, fasteners 280 are rotated sufficiently to draw the respective components together in a loose manner. A spin-off socket (not shown) may be employed to leave a small predetermined distance from the heads of fasteners and their corresponding components. Presently, a distance of approximately ⅛ inch (0.12 inch) is preferred. Assembly of the second body structure 34 in this manner permits second body structure 34 to be installed to first body structure 30 at one time while providing for size variation in the width of first body structure 30. More specifically, the tube-in-tube design of the lower radiator tube structure 78 and lower fender rail structure 94 permits the lateral body structures 70a, 70b to telescope inwardly or outwardly as needed to adjust for the width of first body structure 30. Similarly, fixing the clinch nuts 270 to upper fender rail structure 90 and engaging fasteners 280 through the slotted retention apertures 192 permits the forward sections 118 of the upper fender rail structures 90 to move along an axis perpendicular to the longitudinal axis of vehicle 10 to adjust for the width of first body structure 30. In order to facilitate the movement of upper and lower radiator tube structures 74 and 78, fasteners 280 are preferably engaged into clinch nuts 270 and 274 such that a clamping force of less than about 10 lbf. and preferably less than about 2 lbf.

After the second body structure 34 has been loosely assembled, a force is applied to lateral body structures 70a, 70b to splay the ends 284 of second body structure 34 (i.e., the ends corresponding to rearward end sections 110 and 140) outwardly from the longitudinal axis of vehicle 10. Second body structure 34 is next introduced to first body structure 30 such that rearward end sections 110 and 140 are proximate the corresponding second recessed portions 52. A force is then applied to the ends 284 of second body structure 34 to position the inner surfaces 252 and 256 of upper and lower frame rail structures 90 and 94, respectively, against the outer surfaces 300 of side panels 40a and 40b such that each of the rearward end sections 110 and 140 are at least partially disposed in the respective second recessed portions 52.

A securing means 304 is employed to fixedly couple upper and lower fender rail structures 90 and 94 to the respective side panels 40a and 40b. Securing means 304 may include, for example, a conventional threaded fastener, a rivet or a weld. First upper and lower securing apertures 122 and 152 are employed to permit the inner wall of upper and lower fender rail structures 90 and 94 to be coupled to the associated side panel 40. In the particular embodiment illustrated, spot welds are employed to fixedly couple upper and lower fender rail structures 90 and 94 to the respective side panels 40a and 40b. A spot welding tool (not shown) is introduced through first upper and lower securing apertures 122 and 152. The spot welding tool exerts a clamping force against the inner wall of upper and lower fender rail structures 90 and 94 and side panel 40 to draw these structures together. The spot welding tool then discharges electricity through side panel 40 and upper and lower fender rail structures 90 and 94 to fuse these structures together at predetermined points. The spot welding tool is thereafter removed.

Figure 6:
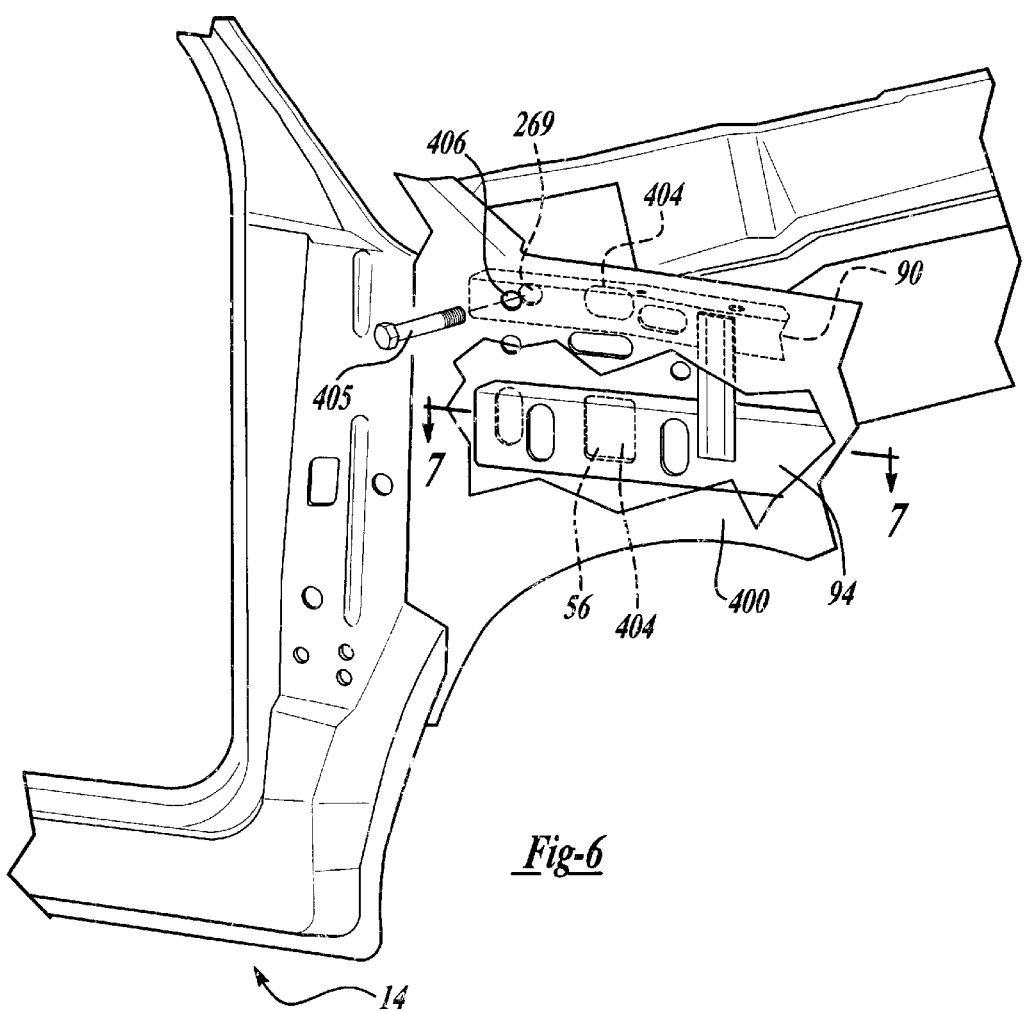
FIG. 6 is a perspective view of a portion of the vehicle of FIG. 1.
Figure 7:
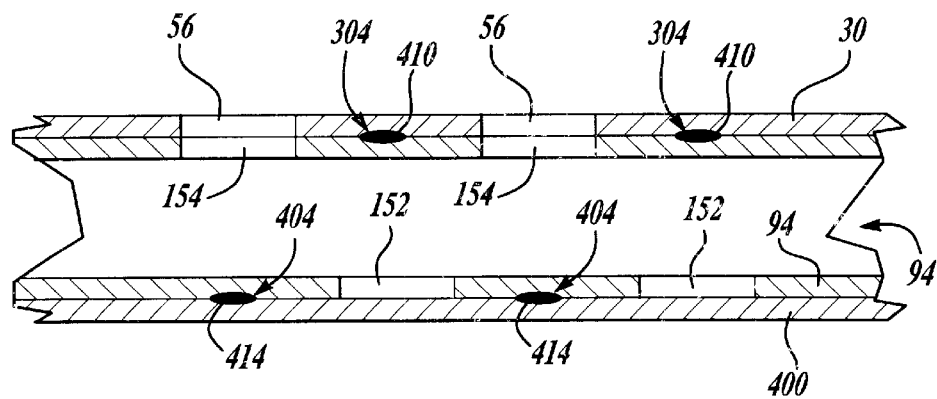
FIG. 7 is a cross-sectional view taken along the line 7—7 of FIG. 6.

With reference to FIGS. 6 and 7, a pair of aperture extension structures 400 are coupled to vehicle body so as to cover at least a portion of lateral body structures 70a and 70b, respectively. Each aperture extension structure 400 is preferably formed from a sheet metal material and renders side panels 40a and 40b and lateral body structures 70a, 70b suitable for coupling to conventional sheet metal fabrications, such as fenders (not shown).

A securing means 404 is employed to fixedly couple upper and lower fender rail structures 90 and 94 to the respective aperture extensions 400. Again, securing means 404 may include, for example, a conventional threaded fastener, a rivet or a weld. First securing apertures 56 and second lower securing apertures 154 are employed to permit the outer wall of lower fender rail structures 94 to be coupled to the associated aperture extension structure 400. In the particular embodiment illustrated, spot welds are employed to fixedly couple lower fender rail structures 94 to the respective aperture extension structures 400. A spot welding tool is introduced through one of the first securing apertures 56a and second lower securing aperture 154. The spot welding tool exerts a clamping force against the inside surface of the outer wall of lower fender rail structures 94 and against the outer surface of aperture extension structure 400 to draw these structures together. The spot welding tool then discharges electricity through aperture extension structure 400 and lower fender rail structure 94 to fuse these structures together at predetermined points. The spot welding tool is thereafter removed.

Also in this particular embodiment, fasteners 405 are employed to fixedly couple upper fender rail structures 90 to their respective aperture extension structures 400. Fasteners 405 are placed through fastener apertures 406 in each of the aperture extensions 400. Fasteners 405 extend through their associated aperture extension 400 and threadably engage one of the clinch nuts 269 in upper fender rail structure 90. In the particular embodiment illustrated, fasteners 405 also engage a hood hinge to secure aperture extension 400, upper fender rail 90 and the hood hinge together.

FIG. 7 shows the spot welds 410 which secure the side panels 40a and 40b and upper and lower frame rail structures 90 and 94 together are spaced axially apart from the spot welds 414 securing the upper and lower frame rail structures 90 and 94 to the aperture extension structures 400. The staggered relationship of welds 410 and 414 increases the strength and rigidity of this joint, improving the robustness of the design.

Returning to FIG. 1, wheel house liner 28 is employed to inhibit the vehicle wheels from slinging dirt, moisture and grime into the vehicle engine compartment when vehicle 10 is operating. Wheel house liner 28 is formed from a plastic sheet material, such as polypropylene and coupled to a lower surface 260 of lower fender rail structure 94. Wheel house liner 28 may be formed from a series of strips or may be formed through a conventional molding process, such as blow molding or vacuum formed. As compared to conventional sheet metal shrouding, wheel house liner 28 is lightweight and highly flexible.

Figure 8:
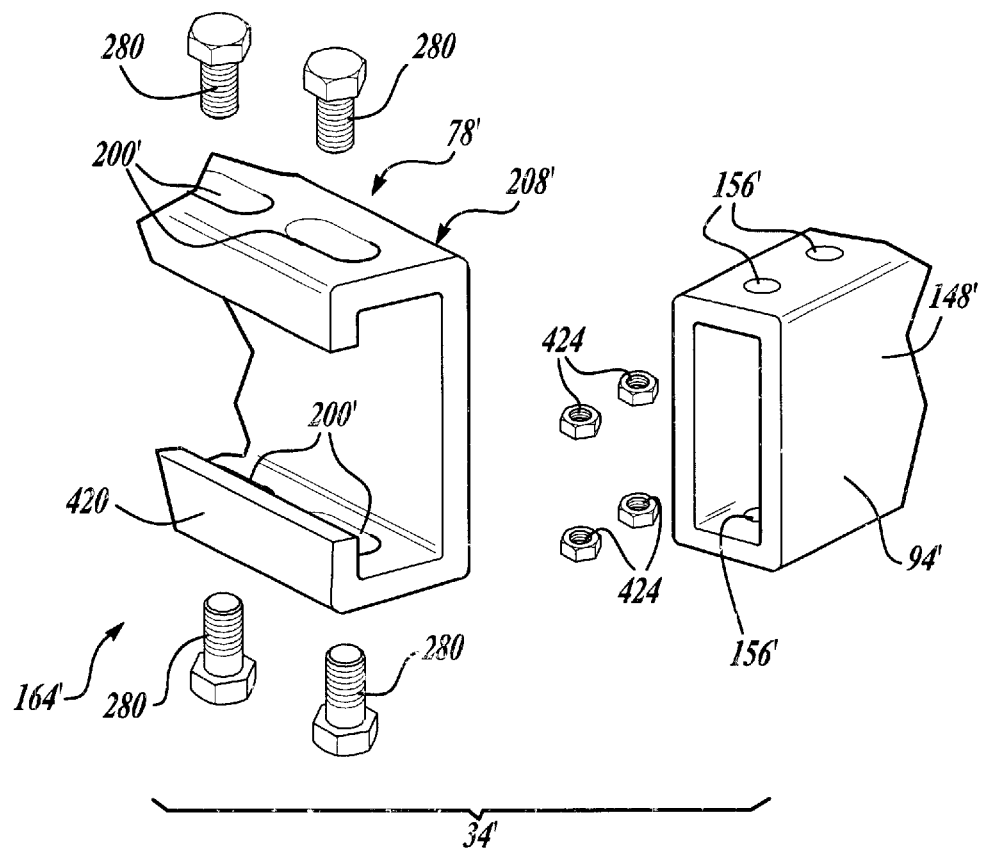
FIG. 8 is a perspective view similar to that of FIG. 4 but showing the construction of the vehicle in accordance with the teachings of another preferred embodiment of the present invention.

While the vehicle body of the present invention has been described thus far as being comprised of various hydroformed tube structures having square or rectangular cross sections which collectively form the front end of a vehicle body, those skilled in the art will appreciate that the invention, in its broader aspects, may be constructed somewhat differently. For example, one or more of the structures forming the second body portion may be formed from conventional tubing or channel as shown in FIG. 8 where the lower radiator tube structure 78' is formed from a steel channel 420 having a generally C-shaped cross section.

In this arrangement, the fastener apertures 200' in lower radiator tube structure 78' are slotted. Lower fender rail structure 94' is generally similar to lower fender rail structure 94 except that the fastening apertures 156' in forward end section 148' are round rather than slotted and a plurality of clinch nuts 424 are inserted into fastening apertures 156' and coupled to the interior of forward end sections 148' as shown. The right end section 208' of lower radiator tube 78' includes an insertion member 164' which is slid over the forward end section 148' of the lower fender rail structures 94', providing a tube-in-channel structure. Fasteners 280 are then placed through fastener apertures 200' and fastening apertures 156' to threadably engage clinch nuts 424.

Figure 9:
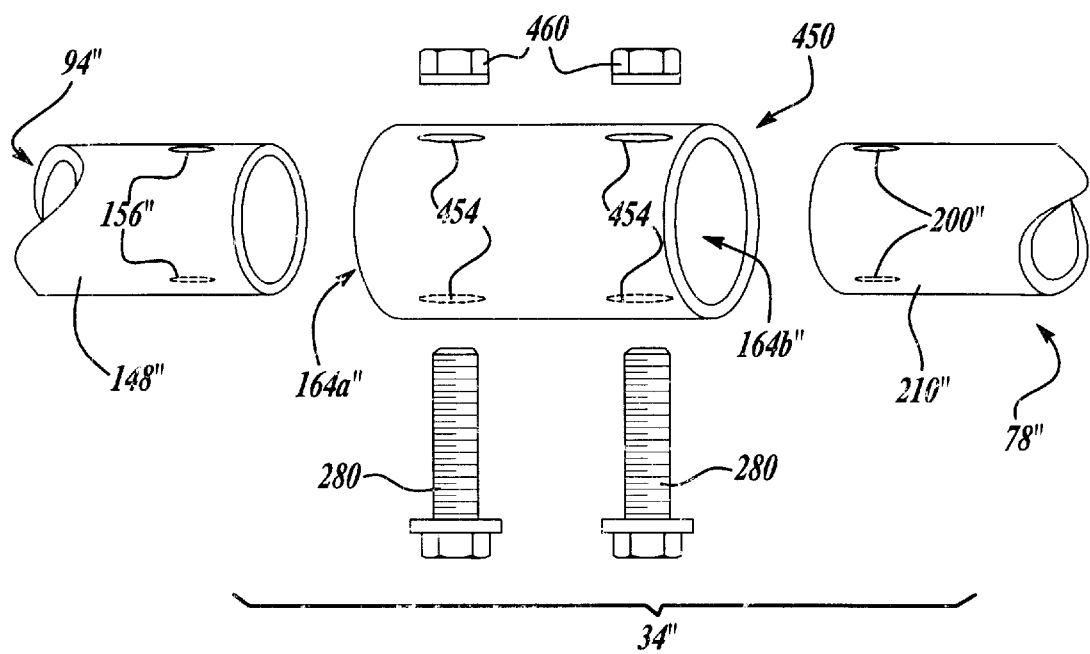
FIG. 9 is a perspective view similar to FIG. 8 but showing the construction of the vehicle in accordance with the teachings of another preferred embodiment of the present invention.

In each of the previous examples, the second body structure included at least one tube insertion member to permit one tube or rail structure to fit at least partially within another tube or rail structure to provide a tube-in-tube or tube-in-channel design. As another example, the tube insertion member may be a discreet member as shown in FIG. 9.

In this arrangement, the forward end sections 148" of lower fender rail structure 94" and the left end section 210" of the lower radiator tube structure 78" are illustrated to have a generally round cross section with outside diameters which are approximately equal. Fastener apertures 200" and fastening apertures 156" are slotted with the major axis of these slots being generally perpendicular to the longitudinal axis of vehicle 10.

A coupler 450 is illustrated as being formed from a tubular material having an inside diameter which is slightly larger than the outside diameters of forward end sections 148" and left and right end sections 208" and 210". Couplers 450 each include a plurality of fastening apertures 454 which extend through coupler 450 along an axis perpendicular to the longitudinal axis of vehicle 10". The open ends of coupler 450 form a pair of laterally opposed tube insertion members 164a" and 164b".

A first one of the couplers 450 is operable for coupling one of the lower fender rail structures 94" to the left end section 208" of lower radiator tube structure 78" and a second one of the couplers 450 is operable for coupling the other one of the lower fender rail structures 94" to the right end section 210" of lower radiator tube structure 78". As the method for joining couplers 450 to the lower fender rail structures 94" and lower radiator tube structure 78" is similar, only the connection of coupler 450 to the right end section 210" of lower radiator tube structure 78" will be discussed in detail. The forward end section 148" is placed in tube insertion member 164a and right end section 210" is placed in tube insertion member 164b. Fasteners 280 are placed through fastener apertures 200" and fastening apertures 156" and 454 and rotated to threadably engage nuts 460. Those skilled in the art should readily understand that coupler 450 may also be prefastened to either lower fender rail structure 94" or lower radiator tube structure 78" through a conventional fastening or joining process, such as threaded fasteners, rivets, adhesives or welds.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method for fabricating a vehicle body comprising the steps of:
   providing a first body structure having a first securing portion formed at least partially from a sheet metal material;
   providing a second body structure having a second securing portion formed at least partially from a unitarily formed tubular metal material;
   providing a third body structure having a third securing portion formed at least partially from a sheet metal material;
   joining said first and second body structures together by fixedly coupling said first and second securing portions together; and
   joining said second and third body structures together by fixedly coupling said second and third securing portions together so that said second securing portion is sandwiched between said first and second securing portions.

2. The method of claim 1, wherein the first securing portion includes a first set of securing apertures, said first set of securing apertures facilitating a weld operation to fixedly couple said second and third securing portions together.

3. The method of claim 2, wherein the step of joining said second and third body structures includes the step of spot welding said second and third securing portions together.

4. The method of claim 2, wherein said second securing portion includes a second set of securing apertures spaced apart from said first securing apertures, said second set of securing apertures facilitating a weld operation to fixedly couple said first and second securing portions together.

5. The method of claim 4, wherein the step of joining said first and second body structures includes the step of spot welding said first and second securing portions together.

6. The method of claim 1, wherein said second securing portion is a hydroformed tubular material.

7. The method of claim 1, wherein said first body structure includes a plenum, a dash and a floor.

8. The method of claim 7, wherein said second body structure includes a pair of spaced apart lower fender rail structures and a lower radiator tube structure.

9. A method for assembling a vehicle body comprising the steps of:

providing a pair of first body rail structures, each of said pair of first body rail structures having first and second body rail portions, said first body rail portion extending in a generally longitudinal direction, said second body rail portion coupled to an end of said first body rail portion and extending therefrom in a direction generally perpendicular to said first body rail portion;

providing a second body rail structure extending generally perpendicular said longitudinal axis;

slidingly engaging said second body rail to each of said second body rail portions to form a generally U-shaped first body structure;

providing a second body structure having a pair of laterally spaced apart first securing portions, each of said first securing portions formed at least partially from a sheet metal material;

positioning said first body structure in a splayed condition wherein a force is exerted to each of said first body rail structures causing a distal end of said each of first body rail portion to pivot outwardly from said second body rail structure;

inserting said first body structure to said second body structure;

exerting a force to each of said first body rail structures causing said each one of said pair of first body rail structures to contact one of said pair of first securing portions;

fixedly coupling said each one of said pair of first body rail structures to one of said first securing portions; and fixedly coupling said second body rail structure to each of said pair of first body rail structures.

10. The method of claim 9, wherein the step of slidingly engaging said second body rail to each of said pair of second body rail portions includes the steps of:

slidingly engaging said second body rail to one of said pair of second body rail portions;

slidingly engaging said second body rail to the other one of said pair of second body rail portions;

inserting at least two threaded fasteners into said second body rail and said pair of second body rail portions; and rotatably engaging said at least two threaded fasteners into a pair of internally threaded members, each of the pair of internally threaded members forming a portion of one of said second body rail and said pair of second body rail portions;

wherein each of said at least two threaded fasteners produces a clamping force having a magnitude of less than 50 lbf after being rotatably engaged.

11. The method of claim 10, wherein said clamping force has a magnitude of approximately zero lbf.

12. The method of claim 11, wherein a head of each of the fasteners is spaced apart from said second body rail and said pair of second body rail portions.

13. A method for fabricating a vehicle body comprising the steps of:

providing a first body structure having a first securing portion formed at least partially from a sheet metal material, said first securing portion including a plurality of first securing apertures formed through at least a portion of the sheet metal material;

providing a second body structure having a second securing portion formed at least partially from a unitarily formed tubular metal material, said second securing portion including a plurality of second securing apertures and a plurality of third securing apertures, the second and third apertures being formed into opposite sides of the unitarily formed tubular metal material;

providing a third body structure having a third securing portion formed at least partially from a sheet metal material;

abutting the first and second body structures against one another such that each of the first securing apertures is aligned to an associated one of the second securing apertures;

inserting a welding tool into each of said plurality of third securing apertures;

welding said first and second securing portions together in an area across from each of said plurality of third securing apertures to thereby fixedly join said first body structure to the unitarily formed tubular metal material of the second body structure;

abutting the third body structure against the tubular metal material of the second body structure;

inserting a welding tool into each pair of first and second securing apertures; and welding said second and third securing portions together in an area across from each of said plurality of first and second securing apertures to thereby fixedly join said third body structure to the unitarily formed tubular metal material of the second body structure.

14. The method for fabricating a vehicle body of claim 13, wherein said welding tool is a spot-welding tool.

15. The method for fabricating a vehicle body of claim 13 wherein said welding tool is a MIG welding tool.

* * * * *

UNITED STATES PATENT AND TRADEMARK OFFICE
CERTIFICATE OF CORRECTION

PATENT NO. : 6,416,119 B1
DATED : July 9, 2002
INVENTOR(S) : Gericke et al.

It is certified that error appears in the above-identified patent and that said Letters Patent is hereby corrected as shown below:

<u>Title page,</u>
Item [73], Assignee, "DaimlerChrysler" should read -- DaimlerChrysler Corporation --.

Signed and Sealed this

Nineteenth Day of August, 2003

JAMES E. ROGAN
*Director of the United States Patent and Trademark Office*